United States Patent Office 2,848,684
Patented Aug. 19, 1958

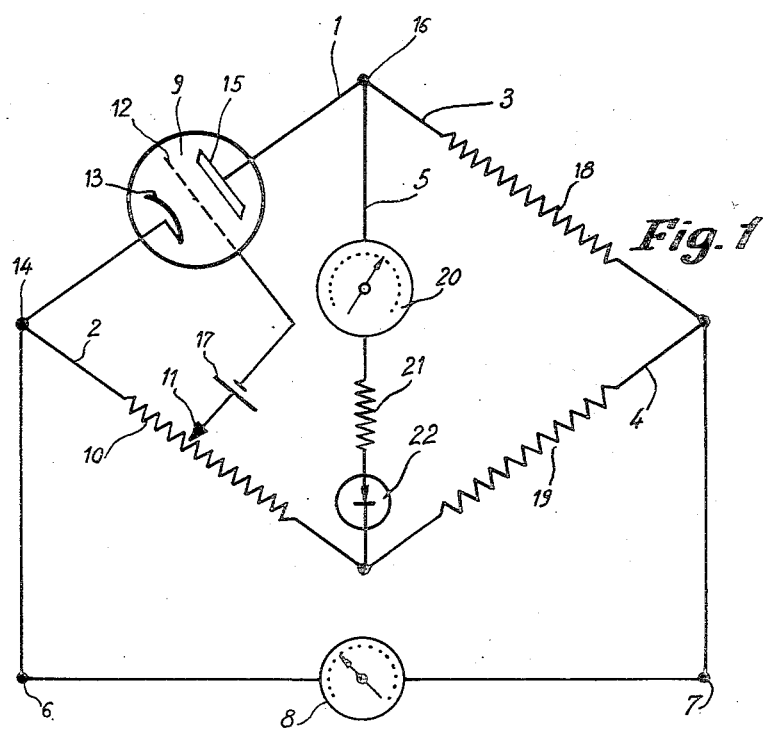
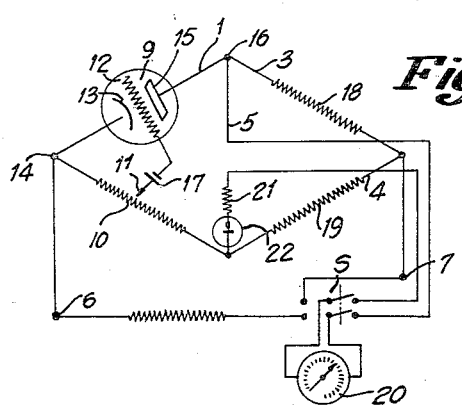

2,848,684

VOLTAGE MEASURING INSTRUMENT PROVIDING READINGS WITH AN ADJUSTABLE MAGNIFICATION RANGE

Claude Tuppin, Elisabethville, France, assignor to Institut de Recherches de la Siderurgie, Saint-Germainen-Laye, France, a professional institution of France Application February 28, 1955, Serial No. 491,166

Claims priority, application France March 4, 1954

4 Claims. (Cl. 324—101)

Electric measuring instruments do not allow generally obtaining an accuracy above 0.2%. It is therefore impossible to detect through such instruments modifications in the magnitude to be measured when the amplitude of said modifications is less than 0.2%. Now, in certain cases, it may be necessary to make sure that the magnitude considered does not vary and consequently the sensitivity of the conventional measuring instruments is generally insufficient.

A main object of the invention consists in removing the above drawback by means of an arrangement adapted to measure an electric voltage with an accuracy in reading which is higher than that generally obtained with the conventional electrical measuring instruments. It is of course sufficient to provide this accuracy between predetermined limits which vary in accordance with the measurements to be executed.

Another object of the invention is to provide a sort of vernier for the measure of electric voltages distinguishing from all existent instruments through the fact that the zero of the scale on the auxiliary instrument, i. e. of the galvanometer, does not correspond to a zero voltage but to a predetermined selected value of the voltage, say 30, 60, 100 volts, etc. Furthermore, a modification in the voltage corresponding to one elementary subdivision of the scale of a conventional voltmeter corresponds on the scale of the galvanometer of the improved arrangement to a modification in the reading by several subdivisions, which leads thus to a considerable increase in the accuracy of reading. The deflection of the galvanometer is proportional to the modification in the voltage to be measured, with reference to the predetermined value of said voltage corresponding to the balance of the Wheatstone bridge, whereby a linear scale is obtained.

The invention is illustrated in the accompanying drawing, in which:

Fig. 1 is a circuit diagram of a preferred embodiment of the invention; and

Fig. 2 is a circuit diagram of another embodiment of the invention.

As illustrated in Fig. 1, the improved instrument includes chiefly a Wheatstone bridge, the four arms of which are designated respectively by 1, 2, 3, 4, while the measuring diagonal is shown at 5 and the terminals at 6 and 7.

Across said terminals is inserted a voltmeter 8, while an electronic tube such as a triode is inserted at 9 in the arm 1 of the bridge and the arm 2 includes a potentiometer 10, the slider 11 of which is connected with the grid 12 of the tube. Owing to the voltmeter, it is possible to bring the potentiometer slider to a point such that the balance of the bridge may be obtained for predetermined values of the voltage.

The cathode 13 of said tube is connected with the connecting point 14 between the arms 1 and 2 in which are inserted respectively the triode and the potentiometer, while the anode 15 is connected with the connecting point 16 between the arms 1 and 3. A supply 17 of biasing voltage is inserted between the grid 12 and the slider 11 on the potentiometer. The Wheatstone bridge illustrated includes as conventional in the art a resistance 18 in the arm 3 and a resistance 19 in the arm 4. Lastly, there is inserted in the measuring diagonal 5 a microammeter or a galvanometer 20, preferably in series with a resistance 21, which may be a variable resistance and with a rectifier 22 connected in a manner such that current can flow through the diagonal 5 only in a predetermined direction.

It will be readily ascertained that for each voltage, equal to Vo at the start and which is variable as desired, applied across the terminals 6–7 of the instrument, there exists a position of the potentiometer slider which provides for the balance of the bridge. The microammeter 20 has then its hand at zero. It is easily proved that when the voltage Vo varies and assumes a value V, this leads to the production of a current $i_p$ through the microammeter, the intensity of which is proportional to the difference V—Vo $$i_p = K(V - Vo)$$

A suitable selection of the different elements forming the bridge allows obtaining a coefficient of proportionality K which is satisfactory for the increase in accuracy required for the reading. Thus for instance, when using an ordinary voltmeter having a sensitivity range extending between 0 and 150 volts, it is possible to define the different positions of the adjusting member constituted by the slider in the example illustrated so that they may balance the bridge for successive values of the voltage differing from each other by 10 volts, whereby the complete scale 0–100 of the microammeter corresponds each time to this difference of 10 volts between successive reference voltages. Consequently, a modification by 10 volts leads on the conventional voltmeter to a shifting of the hand through one subdivision and on the microammeter to a shifting of the hand through 10 subdivisions of its scale; this shows the accuracy of the reading is multiplied by 10.

Obviously, the embodiment described hereinabove and illustrated in the drawing, is given by way of a mere exemplification and it is possible to modify in any desired manner the shape, arrangement, nature and mounting of the elements of the instrument without unduly widening thereby the scope of said invention as defined in the accompanying claims. Thus it is possible to insert inside a same casing the voltmeter and the microammeter; since the Wheatstone bridge is constituted by parts which are not bulky, it is possible to substitute for the slider 11, a number of tappings on the resistance 10. A selective switch may be used so as to operatively connect for different values of the voltages, say 40, 60, 80, 100 suitable tappings which have been gauged once and for all at the moment of the mounting of the instrument.

It is also possible to simplify the arrangement to a still further extent, as shown in Fig. 2, by omitting the voltmeter 8; an auxiliary switch S would allow then positioning the microammeter selectively either between the terminals 6 and 7 or in the diagonal 5 since the instrument may also operate as a voltmeter by inserting a resistance in series therewith. It is also possible to cut out the rectifier in the measuring diagonal 5 and to resort to a galvanometer having a central zero on its scale, so as to detect any modification in the voltage by measures made both above and below a predetermined value.

Lastly, the arrangement may also serve as a relay operating for minimum and maximum voltage or as a signalling relay, the working being performed between very close limits as allowed by the greatly increased accuracy whereby it is possible to provide movable or stationary contact-pieces which are sufficiently spaced with refer-

What I claim is:

1. A voltage measuring instrument for providing readings with an adjustable magnification range comprising, in combination, a Wheatstone bridge having four arms, an electronic tube inserted in the first of said arms, a grid in said electronic tube, a voltage divider having a constant overall resistance and an adjustable point located in the second of said arms, said second arm being adjacent to said first arm on the cathode side of said electronic tube, said adjustable point being connected to said grid, a third arm adjacent to said first arm on the anode side of said electronic tube, a first fixed resistance in said third arm, a fourth arm between said second and said third arms, a second fixed resistance in said fourth arm, means for applying the voltage to be measured across one diagonal of the bridge with the first and the third arms at one side of said diagonal, and means for measuring the current across the other diagonal of the bridge.

2. A voltage measuring instrument as in claim 1 wherein the voltage divider is a potentiometer and the adjustable point is the slider of said potentiometer.

3. A voltage measuring instrument as in claim 1 which comprises further a voltmeter connected across the diagonal of the bridge, at which the voltage to be measured is applied.

4. A voltage measuring instrument for providing readings with an adjustable magnification range comprising, in combination, a Wheatstone bridge having four arms and a measuring diagonal, an electronic tube inserted in the first of said arms, a grid in said electronic tube, a voltage divider having a constant overall resistance and an adjustable point located in the second of said arms, said second arm being adjacent to said first arm on the cathode side of said electronic tube, said adjustable point being connected to said grid, a third arm adjacent to said first arm on the anode side of said electronic tube, a first fixed resistance in said third arm, a fourth arm between said second and said third arms, a second fixed resistance in said fourth arm, said first and said second arm being at one side of said measuring diagonal, means for applying the voltage to be measured across the other diagonal of the bridge, a first resistance and a galvanometer inserted in said measuring diagonal, a second resistance, and switch means for alternately connecting said galvanometer in series with said first resistance or across said other diagonal in series with said second resistance, whereby the galvanometer may be used either to measure the current in said measuring diagonal or as a voltmeter across the bridge terminals.

References Cited in the file of this patent

UNITED STATES PATENTS

| | | |
|---|---|---|
| 2,434,610 | Feiker | Jan. 13, 1948 |
| 2,497,961 | Shaw | Feb. 21, 1950 |
| 2,644,136 | Mullins | June 30, 1953 |
| 2,713,663 | Cable | July 19, 1955 |